(12) United States Patent
Marquardt et al.

(10) Patent No.: US 9,335,581 B2
(45) Date of Patent: May 10, 2016

(54) DISPLAY WITH AN ELECTRO-OPTICAL DISPLAY MODULE

(71) Applicants:Helmut Marquardt, Darmstadt (DE); Wolfgang-Peter Pawusch, Hochheim (DE); Hans Wedel, Muehltal (DE)

(72) Inventors: Helmut Marquardt, Darmstadt (DE); Wolfgang-Peter Pawusch, Hochheim (DE); Hans Wedel, Muehltal (DE)

(73) Assignee: Continental Automotive GmbH, Hannover (DE)

( * ) Notice: Subject to any disclaimer, the term of this patent is extended or adjusted under 35 U.S.C. 154(b) by 25 days.

(21) Appl. No.: 14/367,762

(22) PCT Filed: Dec. 19, 2012

(86) PCT No.: PCT/EP2012/076056
§ 371 (c)(1),
(2) Date: Jun. 20, 2014

(87) PCT Pub. No.: WO2013/092647
PCT Pub. Date: Jun. 27, 2013

(65) Prior Publication Data
US 2015/0062868 A1    Mar. 5, 2015

(30) Foreign Application Priority Data
Dec. 20, 2011   (DE) .......... 10 2011 089 266

(51) Int. Cl.
*G02F 1/1335*    (2006.01)
*G02F 1/1333*    (2006.01)
*G02F 1/1339*    (2006.01)

(52) U.S. Cl.
CPC ........ *G02F 1/133524* (2013.01); *G02F 1/1333* (2013.01); *G02F 1/13392* (2013.01); *G02F 1/133308* (2013.01); *G02F 2001/133311* (2013.01); *G02F 2001/133331* (2013.01); *G02F 2202/28* (2013.01)

(58) Field of Classification Search
CPC .......... G02F 1/133524; G02F 1/13392; G02F 1/1333; G02F 1/133308
See application file for complete search history.

(56) References Cited

U.S. PATENT DOCUMENTS

| 2001/0010630 A1 | 8/2001 | Umemoto |
| 2007/0040798 A1* | 2/2007 | Kawai ............... G02F 1/167 345/107 |
| 2012/0092580 A1* | 4/2012 | Dighde ............. G06F 3/0412 349/58 |

FOREIGN PATENT DOCUMENTS

| DE | 303 0 064 | 3/1982 |
| DE | 384 0 542 | 11/1989 |
| DE | 412 9 794 | 3/1993 |
| DE | 433 9 909 | 10/1996 |
| DE | 197 05 536 | 8/1998 |
| DE | 202 02 231 | 6/2002 |
| DE | 101 31 296 | 10/2002 |

* cited by examiner

*Primary Examiner* — Anne Hines
(74) *Attorney, Agent, or Firm* — Cozen O'Connor

(57) ABSTRACT

A display with an electro-optical display module has a display area, with a light-transmissive cover arranged between the display area and a possible observer of the display area. The light-transmissive cover is bonded onto the display area by an adhesive, and provision is made for the surface of the light-transmission cover to be configured in a three-dimensional fashion.

15 Claims, 2 Drawing Sheets

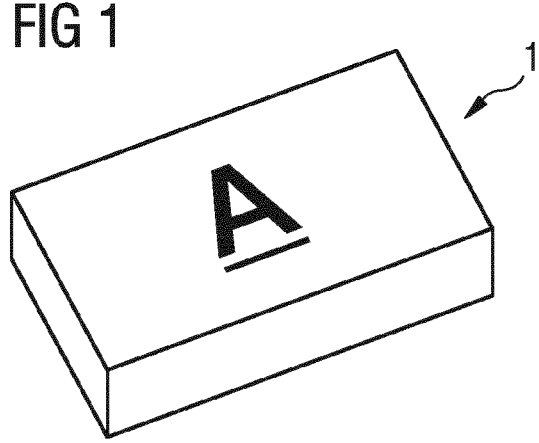
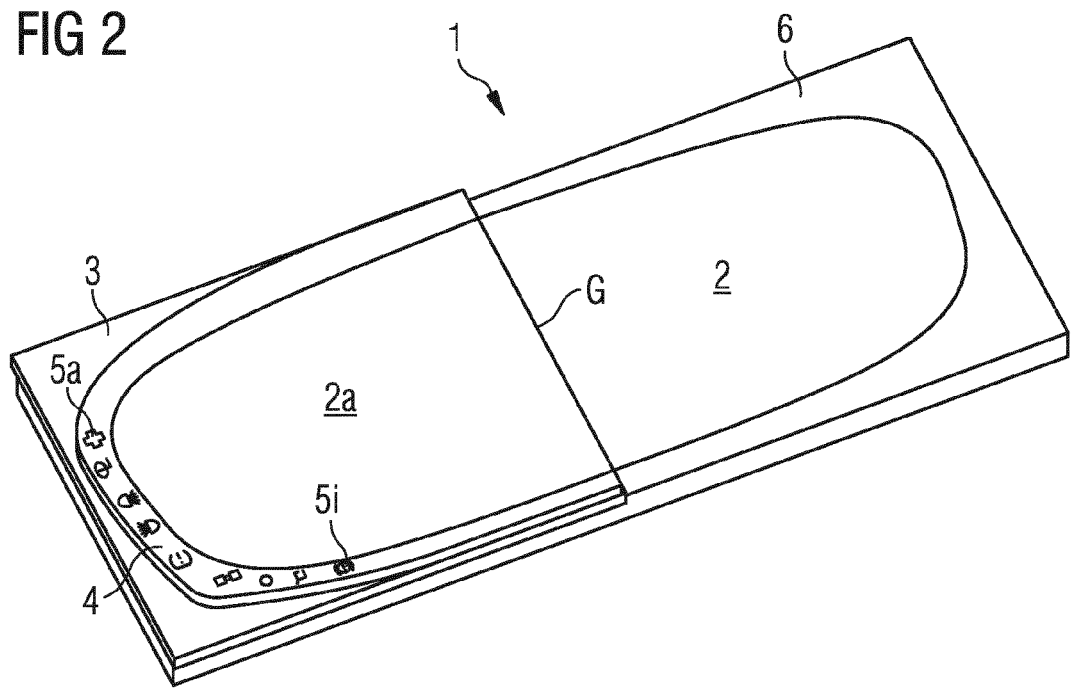

DISPLAY WITH AN ELECTRO-OPTICAL DISPLAY MODULE

CROSS REFERENCE TO RELATED APPLICATIONS

This is a U.S. national stage of application No. PCT/EP2012/076056, filed on Dec. 19, 2012. Priority is claimed on German Application No. DE102011089266.4, filed Dec. 20, 2011, the content of which is incorporated herein by reference.

BACKGROUND OF THE INVENTION

1. Field of the Invention

The invention relates to a display with an electro-optical display module, having a display area and a transparent cover arranged between the display area and a possible observer of the display area, the transparent cover being bonded onto the display area by a transparent adhesive.

2. Description of Prior Art

Electro-optical display modules are, for example, liquid-crystal displays or organic light-emitting diodes displays used, for example, as displays or combined display and input areas, for example in cell phones. In order to protect electro-optical display modules, they are additionally covered with transparent covers bonded onto the display areas of the electro-optical display modules by an adhesive, thereby protecting the electro-optical display module mechanically. Such displays are also increasingly used in automobiles, for example to produce complete combination instruments. When trim elements or information elements, such as scale rings for example, are mounted on the cover, undesired gaps or joints occur.

SUMMARY OF THE INVENTION

An object of the invention is to specify the above displays with trim elements or information elements so that no undesired gaps or joints occur. This object is achieved by virtue of the fact that the surface of the transparent cover is configured in a three-dimensional fashion. Consequently, it is possible, owing to the three-dimensional configuration, to implement trim elements such as scale rings, for example, without the occurrence of undesired gaps or joints. When the cover is bonded onto the display area only in sub-areas, it is possible to provide additional components between the transparent cover and the display area. If the transparent cover is bonded in the sub-areas of the display area, which can be perceived by a possible observer, the result, firstly, is that the display area that can be perceived by the observer has a uniform appearance, and secondly it is possible to mount in the regions of the cover configured in a three-dimensional fashion, for example as a trim or scale ring, additional components under the trim rings or scale rings, for example, in order to be able to illuminate them separately.

The cover can be produced in a particularly simple and inexpensive fashion when it consists of a film. The three-dimensional design of the film can be implemented particularly easily by deep-drawing the film. The three-dimensional configurations of the film are particularly effective when they are printed. When a film is being printed it is useful to print the film before the deep-drawing since it is then substantially easier to print. When the film is printed on the side averted from the possible observer, the printing is protected against mechanical abrasion, for example when the display is used as an input device.

When spacers are distributed in the adhesive, a constant spacing can be implemented between the cover and the display area. A particularly attractive optical impression is made by the display when the spacers are transparent and have the same refractive index as the adhesive: it is then impossible to perceive the spacers when the display is viewed normally. When the spacers are uniformly configured, the spacing is set even more accurately. This applies likewise when adjacent spacers have the same spacing from one another. It is particularly preferred when the spacers have a diameter of 0.4 mm. The spacers can, for example, be configured as balls with the diameter or as threads with the diameter. An additional illumination of the display can be implemented by arranging light guides between the display area and the cover. It is thereby possible, for example, to implement additional illumination of the trim or scale elements. When the light guides decouple light in the direction of the cover via a light decoupling area, it is, for example, possible to produce an individual illumination at specific sites of the three-dimensional configuration such as, for example, the scale ring, in order thus, for example, to highlight a specific fixed or adjustable value on the scale. When a backlit symbol is arranged on the cover above the light decoupling area, the illumination of the symbol can constitute an additional information item such as, for example, a warning.

BRIEF DESCRIPTION OF THE DRAWINGS

The invention is explained in more detail below with the aid of the figures, in which:

FIG. 1 shows an electro-optical display module according to the prior art;

FIG. 2 shows an exemplary embodiment of a particularly preferred inventive display having a cover illustrated only in part;

DETAILED DESCRIPTION OF THE PRESENTLY PREFERRED EMBODIMENTS

Figure 3:
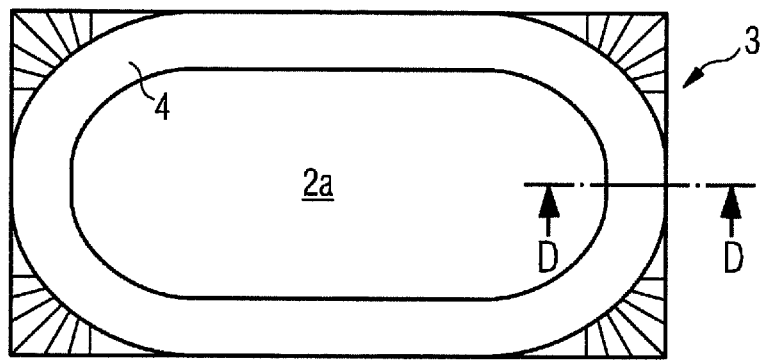
FIG. 3 shows a plan view of a further exemplary embodiment of an inventive display.

The electro-optical display module in FIG. 1 is configured, for example, as a liquid-crystal display and has a display area A which usually covers virtually a complete side of the display module. The display module can, for example, be configured as a point-matrix display; there are, however, also other possible electro-optical display modules.

The first exemplary embodiment of the inventive display in FIG. 2 shows the electro-optical display module 1 having the display area A and shows a cover 3 of which only half is illustrated and which has a three-dimensional structure 4. Backlit symbols 5a to 5i are illustrated in the three-dimensional structure 4 configured as a trim frame. The symbols 5a to 5i can, for example, be implemented by printing the cover 3. The print can be configured thereby such that the symbols can be perceived only when they are appropriately backlit. This is possible, for example, by applying to the printed symbols in the direction of a possible observer a further coating that covers the symbols in the case of pure reflected light but which, given appropriate backlighting, passes the light emitted by the symbols to an appropriate observer. Furthermore, it is to be seen from the region not covered by the cover 3 that the display area A is divided into two regions, specifically on the one hand into the region in which the adhesive 2 is applied, and into the unbonded region 6 to which no adhesive is applied. Since the display, and thus also the cover 3, is constructed symmetrically to the boundary line G of the cover 3, it can be seen that the region of the cover 3 that is bonded onto the display area with the adhesive 2 has a planar configuration, and the region that is not bonded has the three-dimensional structure 4. The boundary line G is perceivable only in the present figure due to the only partial illustration of the cover 3: the cover 3 covers the display area A completely in the case of the inventive device. Since the three-dimensional structure and the regions, lying outside the three-dimensional structure, of the cover 3 are printed, all that can be perceived by an observer is the region of the display area to which the adhesive 2 is applied and which is connected to the cover 3 by the adhesive. In this case, there is no need for the areas to be precisely delimited. However, it is entirely possible to also print the cover within the trim frame so that a clean transition can be implemented, thus preventing a possible observer being able also to perceive unbonded areas of the display area A.

The exemplary embodiment of the inventive display in FIG. 3, is of similar construction to the exemplary embodiment in FIG. 2, and so the same reference symbols are used for the same components. The cover and the three-dimensional structure 4 in the form of a frame and the region 2a of the cover 3, which is bonded by the adhesive, are to be seen. The existing display area A could be used in principle outside the frame, but this is mostly not done, for esthetic reasons. Consequently, the cover 3 is advantageously printed in the regions.

Figure 4:
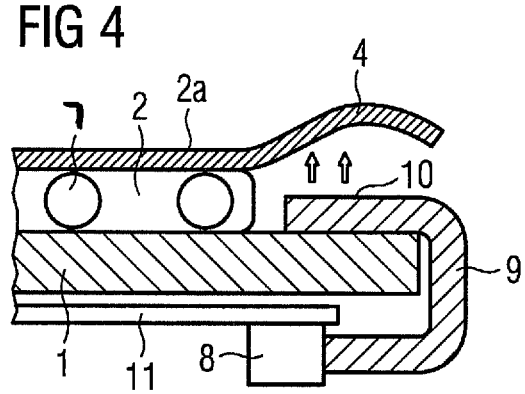
FIG. 4 shows a first possible configuration of the section D-D from FIG. 3.

Seen in FIG. 4 are an electro-optical module 1, the cover 3 with the regions 2a and 4, adhesive 2 with spacers 7, an LED 8, a light guide 9 with a decoupling area 10, and a printed circuit board 11, on which the LED 8 is arranged. The cover 3 is bonded onto the electro-optical module 1 in the region 2a by the adhesive 2. Space is present between the three-dimensional structure 4 and the electro-optical module 1, which means that the light guide 9 too finds a place. Light can thus be coupled into the light guide 9 by the LCD 8, and be decoupled by the decoupling area 10. The three-dimensional structure can thus be illuminated, particularly whenever a symbol 5a to 5i from FIG. 2 is located in it. The symbols can thus be illuminated very brightly. In principle, it would also be possible to use the electro-optical module itself, for example given an LCD the appropriate pixels could be switched to beneath the three-dimensional structure 4, thus also implementing an illumination. However, since, for example, an LCD has very high light losses, it is possible in this way to implement only relatively low luminosities, or else there would be the need to apply in the regions a very high luminosity, which would be sent through the LCD.

Figure 5:
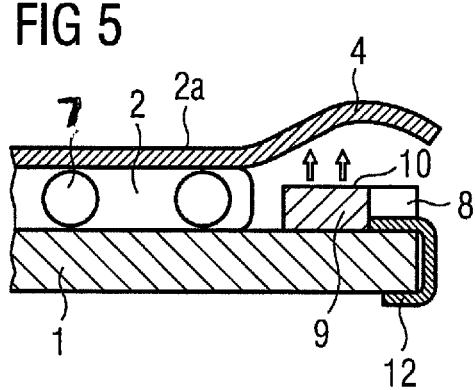
FIG. 5 shows a second possible configuration of the section D-D from FIG. 3.

A second possibility of direct illumination of the three-dimensional structure is shown in FIG. 5. Here, there is present only a relatively short light guide 9, having a decoupling area 10 into which an LED 8 light is coupled, and which is likewise arranged between the electro-optical module 1 and the three-dimensional structure 4. The LED 8 receives its electrical energy via a flexible printed circuit board 12.

The invention can also be easily modified. For example, the region 2a of the cover 3, which is bonded onto the display module 1, can also be coated with a transparent lacquer or be provided with some other coating, in order to implement an overall presentation of the display which is as uniform as possible. However, it is to be ensured here that the additional coating adsorbs additional light so that, given a required minimum brightness of the display, the appropriate illumination of the display must be intensified.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A display with an electro-optical display module (1), comprising:
   a display area (A);
   a transparent cover (3) arranged between the display area (A) and a possible observer of the display area (A); and
   an adhesive configured to bond the transparent cover (3) onto the display area (A),
   wherein the surface of the transparent cover (3) has a planar inner region (2a) bonded by adhesive onto the display area (A) and a peripheral region (4), the peripheral region surrounding the planar inner region (2a) and having an arcuate cross-sectional profile that extends above the plane of the planar inner region (2a).

2. The display as claimed in claim 1, wherein the transparent cover (3) is bonded onto the display area (A) only in the planar inner region (2a).

3. The display as claimed in claim 2, wherein the transparent cover (3) is bonded at the inner region (2a) in areas of the display area (A) that can be perceived by the possible observer.

4. The display as claimed in claim 1, wherein the transparent cover (3) consists of a film.

5. The display as claimed in claim 4, wherein the film is deep-drawn.

6. The display as claimed in claim 4, wherein the film is printed.

7. The display as claimed in claim 6, wherein the film is printed on a side averted from the possible observer.

8. The display as claimed in claim 1, further comprising spacers (7) distributed in the adhesive (2).

9. The display as claimed in claim 8, wherein the spacers (7) are transparent and have the same refractive index as the adhesive (2).

10. The display as claimed in claim 8, wherein the spacers (7) are uniformly configured.

11. The display as claimed in claim 8, wherein adjacent spacers (7) are uniformly spaced with respect to one another.

12. The display as claimed in claim 8, wherein the spacers (7) each have a diameter of 0.4 mm.

13. A display with an electro-optical display module (1), comprising:
   a display area (A);
   a transparent cover (3) arranged between the display area (A) and a possible observer of the display area (A);
   an adhesive configured to bond the transparent cover (3) onto the display area (A); and light guides (9) arranged between the display area (A) and the transparent cover (3), wherein the surface of the transparent cover (3) is configured in a three-dimensional manner.

14. The display as claimed in claim 13, wherein the light guides (9) are configured to decouple light via a light decoupling area (10) in the direction of the transparent cover (3).

15. The display as claimed in claim 14, further comprising a backlit symbol (5*a*-5*i*) arranged on the transparent cover (3) above the light decoupling area (10).

* * * * *